United States Patent [19]

Silver

[11] Patent Number: 5,584,699

[45] Date of Patent: Dec. 17, 1996

[54] COMPUTERIZED SYSTEM FOR TEACHING GEOMETRY PROOFS

[76] Inventor: Judith A. Silver, 2908 Ranch Rd., Ashland, Ky. 41102

[21] Appl. No.: 605,758

[22] Filed: Feb. 22, 1996

[51] Int. Cl.$^6$ .............................. G09B 7/00; G09B 23/04
[52] U.S. Cl. .................... 434/201; 434/188; 434/191; 434/211; 434/212; 434/302; 434/303
[58] Field of Search ................................ 434/188–191, 434/198, 201, 202, 209–214, 322, 323, 327, 333, 335

[56] References Cited

U.S. PATENT DOCUMENTS

| | | |
|---|---|---|
| 3,854,226 | 12/1974 | Divine et al. . |
| 4,010,556 | 3/1977 | Ellsworth et al. . |
| 4,117,607 | 10/1978 | Gill . |
| 4,389,194 | 6/1983 | Toll et al. . |
| 4,946,391 | 8/1990 | Hawkins et al. ........................ 434/201 |
| 5,135,398 | 8/1992 | Thornton et al. . |
| 5,137,457 | 8/1992 | Howard et al. . |
| 5,139,423 | 8/1992 | McCormack et al. . |
| 5,281,145 | 1/1994 | Sidrak .................................. 434/215 |
| 5,520,541 | 5/1996 | Shedeur ................................ 434/201 |

OTHER PUBLICATIONS

Teacher's Guide, Geometry Two: Proofs and Extensions (IBM Geometry Series), copyright WICAT Systems, Inc. 1987.

Primary Examiner—Richard J. Apley
Assistant Examiner—Glenn E. Richman
Attorney, Agent, or Firm—Richard C. Litman

[57] ABSTRACT

A system for teaching proofs, including a set of playing cards and a playing field electronically displayed on a computer game screen. The playing field includes two boxes labelled "GIVEN" and "CONCLUSION" for entry of a premise and a conclusion from a theorem (or other problem). By selecting from a certain menu or submenu contained in a window, a card may be reviewed. To set up the playing field, a mathematical statement, displayed on a set-up card of a group of set-up cards containing each statement from the universe of statements known, is entered into the boxes. The statements may be custom labelled. Geometric figures associated with the theorem may also be electronically drawn on the screen by a user to complete the set-up. After set-up is complete, a user then chooses from a set of playing cards, each card displaying a specific mathematical concept from the universe of mathematical concepts such as definitions, postulates, constructions, properties and theorems, and places it on the playing field. The system allows a chosen playing card to be dragged by means of a mouse to the playing field and, if properly placed, to "stick" in place on the playing field. Improperly placed cards "snap" back to their original file position. After each card has been correctly placed, a line between properly placed cards is generated connecting proper premises and conclusions to each other and the GIVEN or CONCLUSION to display a completed proof.

5 Claims, 11 Drawing Sheets

5,584,699

COMPUTERIZED SYSTEM FOR TEACHING GEOMETRY PROOFS

BACKGROUND OF THE INVENTION

1. Field of the Invention

The present invention relates to a computerized system for teaching geometry proofs of a high school level, more particularly, a software program to be utilized with a personal computer generating a plurality of game screens, employing individual cards identifying theorems, definitions, postulates, constructions, and properties for selection and proper placement by use of a mouse or keyboard on one of the plurality of structured computer screens. Various difficulty levels may be selected; one such level provides a screen where improper placement of a card results in automatic return of the card to its original location, whereas proper placement allows the user to step-wise build and complete a proof.

2. Description of the Prior Art

Electronic devices for teaching the logical reasoning used to understand mathematics and geometry have been the subject of a number of other patents found in the prior art. However, none of these inventions are directed at the teaching of geometry proofs. Moreover, none provide a computerized system sufficiently flexible to allow the student to create a lesson, in part based upon her level of understanding and in part based upon prelabelled written textual materials, as well as entertain the student.

A first group of inventions is directed at teaching primary grade schoolers the basic arithmetic operations, such as addition, subtraction, division and multiplication, using easily operated and simply constructed devices. For example, U.S. Pat. No. 3,854,226 issued to Divine et al. on Dec. 17, 1974, discloses an electronic teaching machine for teaching simple mathematic operations by using means of thumbwheel switches to set up an equation. A test switch is depressed to test the correctness of the equation and alerting the user by displaying one of three displays. U.S. Pat. No. 4,389,194 issued to Toll et al. on Jun. 21, 1983, describes an electronic device simulative of a safe or bank vault for teaching addition and subtraction. The door latch opens when a momentary contact switch is depressed after a correctly answered equation has been set up by means of thumbwheel switches. Neither of these devices are structured for or capable of teaching geometry proofs.

A more advanced approach to teaching simple arithmetic is provided in U.S. Pat. No. 4,117,607 issued to Gill on Oct. 3, 1978. It describes a teaching system for teaching multiplication, division, subtraction and addition using a keyboard and electronic circuitry which compares step-by-step solutions with each step entered by the student. A "try again" signal is generated upon an incorrect entry. Also, U.S. Pat. No. 4,010,556 issued to Ellsworth et al. on Mar. 8, 1977, reveals an electronic mathematics trainer which is made up of two hard wired interconnected devices, one being an electronic problem board and the other being a display unit with a keypad. An arithmetic problem printed on a transparency is illuminated by the device, which problem must then manually be entered by a student into a keyboard encoder. A display unit displays the problem and circuitry calculates a correct answer, as well as incorrect answers, from which the student chooses. Upon correctly answering, the device illuminates the next problem on the transparency. This device teaches only basic arithmetic by and is not structured for teaching geometry proofs.

A group of devices is also known in the prior art each of which allow selection of various types of mathematical problems to be taught and incorporate pictorial representations to teach the logic being used. Each of the group, including U.S. Pat. No. 5,139,423 issued to McCormack et al. on Aug. 18, 1992, U.S. Pat. No. 5,137,457 issued to Howard et al. on Aug. 11, 1992, and U.S. Pat. No. 5,135,398 issued to Thornton et al. on Aug. 4, 1992, describe an electronic teaching device which provides such mathematical activities as Place Value, Trade, Target, Solve It, Word Problems, Estimate, Select and Calculator. For example, the Place Value activity provides a pictorial display of the "ones" and "tens" places by representing "tens" by bars of approximately ten times the area of a block for "ones". Blocks are then moved to bars when a mathematical operation is performed on the device to represent the change in place value. These devices all include internally housed and hard-wired memory means for storing digital data which is displayed by display means having representations of the digits zero through nine. Although other mathematic problems, such as the dreaded "word problem", may be selected, these devices are structurally incapable of teaching geometry proofs.

Finally, International Business Machines Corporation (IBM) is known to commercially market software directed to geometry proofs. As noted in Teacher's Guide, Geometry Two: Proofs and Extensions (IBM Geometry Series), copyright WICAT Systems, Inc. 1987, students begin by filling in proofs and then writing their own, whereupon a proofchecker corrects proofs and helps develop general proof strategies. These are general concepts which are fundamental to all teaching of geometry proofs. Moreover, the guide totally fails to disclose or imply any use of playing cards which can be placed on a playing field.

None of the above inventions and patents, taken either singly or in combination, is seen to describe the instant invention as claimed.

SUMMARY OF THE INVENTION

The present invention relates to a computerized system for teaching geometry proofs. The primary focus of the present invention is to provide a means and method by which a student can interact with a computer to better learn proofs of theorems.

However, it must be noted initially that simpler mathematical concepts, such as definitions, postulates, constructions, and properties, must also be understood by a student (and usually precede the teaching of theorems and the proofs thereof) in order for the student to be able to progress to the level of proving a theorem; i.e., each definition, postulate, construction and property is a necessary building block to build the proof of a chosen theorem. Therefore, it should be understood that, although for purposes of the description herein the primary application of the present invention regards theorem proofs, the same means and method are applied to teaching the simpler mathematical concepts noted above. Therefore, each definition, postulate, construction and property has been included in the present invention both for selection for the basis of a proof, as well as, for selection for use in the proof of a theorem. However, each such application will not be described in detail and the description of the present invention as it regards a theorem should be understood as being exemplary of all applications.

As a matter of background, a mathematical proof is an expressed series of logical mental steps to prove a mathematical theorem. Traditional Euclidean geometry theorems taught in geometry classes and texts range from simple to difficult to prove; classic examples include the Isosceles Triangle Theorem and the Pythagorean Theorem. The Isosceles Triangle Theorem will be used to exemplify the operation and concept of the present invention as applied generally. In layman's terms, the Isosceles Triangle Theorem states that when the two upright sides of a triangle are equal in length, the angles formed at the base of the triangle are congruent; stated another way, if two sides of a triangle are congruent, then the angles opposite those sides are congruent. When an isosceles triangle is visualized, these statements become an intuitively recognized concept; one can simply point to the sides and base angles to appreciate the visual similarities and concept behind this theorem.

However somehow, when teaching a proof to a student, visualization of the concepts behind both the entire theorem and each of individual simpler mathematical concepts (usually already learned) comprising the steps of its proof is lost. Presumably, the adherence of proving the theorem using a traditional format, namely starting with a "GIVEN" and ending with a "CONCLUSION" and requiring a serial entry of steps, is in part to blame. The average student, overwhelmed by having to appreciate not only the mathematical concepts themselves but also the traditional format in which they must be expressed, fails to focus on the logical connections between each of the steps of a proof and thus fails to learn. To overcome this problem, the present invention seeks to take advantage of the user-friendliness of personal computers using window formats and graphics capabilities and seeks to minimize the negative effect of the traditional proof format on students by providing a visual pathway which is easy to follow through building a proof.

The present system visually displays and highlights the mental connections made while building a proof by generating a connecting line between properly sequenced steps of a proof. The system relies on the concept that every mathematical concept can be expressed in an IF-THEN format; necessary mathematical statements are provided forming a premise ("If X, . . . ") on which a conclusion rests ("then Y."). A conclusion may in turn be used as a premise on which other mathematical concepts are premised during building of a proof. Thus, a sequence, chain or branching pathway can be built during a proof using the connecting lines.

Thus, the present invention provides a computer software program installed on a personal computer which provides screens having a series of windows, menus, and icons providing a plurality of choices for the student. The student can first choose from the menus and submenus, by clicking icons by mouse or commanding by keyboard, from a plurality of files including 1) "difficulty level" (multiple levels of difficulty in which all, part or none of the mathematical concepts necessary to build the theorem are automatically presented to the student for selection during the course of play), 2) "starting options" (groups of predetermined test matter, which may include theorems or corollaries and problems coordinated with preprinted textual mathematics problems, as well as standardized mathematical statements recognized by the computer to be used to begin play), and 3) "available cards" (each individual definition, postulate, construction, property and theorem, identified and stored as an individual playing card, which is categorized by group, and may be drawn by the student during play to build the proof).

Each screen displays a structured format, having an upper starting block labelled "GIVEN" and a lower ending block labelled "CONCLUSION", between which a playing field is provided. Each such block is provided for placement of the premise and conclusion of a theorem or corollary, or other statement selected from the Starting Options menu, for proof. Upon selection, a geometric figure which relates to the theorem may also be displayed or electronically drawn by the student outside the playing field. The system further allows a student to customize a theorem or selected statements by custom labelling each of the segments, angles, etc. (e.g. triangle ABC and segment AB) so as to match the geometric figure to the terminology used in the statement or vice versa, or to match predetermined written textual problems. These steps are followed in order to set up the game for play.

To begin play, cards are chosen from Available Cards and placed on the playing field. After each card is correctly placed, the computer draws a line connecting proper premises and conclusions between properly placed cards or between properly placed cards and the GIVEN or CONCLUSION. The system allows a chosen card to be dragged by means of a mouse to the playing field following the GIVEN (or preceding the CONCLUSION) and, if properly placed, to "stick" in place. Improperly placed cards "snap" back to their original file. Thus, the system allows the proof to proceed with immediate feedback regarding the correctness of the selection by the student and linkage of the steps clearly drawn and visible to the student, allowing the student to focus on the proper sequencing and connections between each of cards.

Accordingly, it is a principal object of the invention to provide a computer program run in combination with a personal computer, utilizing a mouse or a keyboard, which teaches geometry proofs by allowing a student to electronically interact and solve a proof with the aid of the computer.

It is another object of the invention to provide for a computer program which provides screens having a playing field, menus, submenus, icons, a plurality of files, and a plurality of cards having predetermined mathematical concepts used in forming a proof from which a student may select to complete a proof by playing each card on a playing field.

It is a further object of the invention to provide for a computer program which allows cards placed into a playing field to be connected in a manner that graphically displays the mathematically correct connections between playing cards.

Still another object of the invention is to provide for a computer program which is coordinated with problems printed in a textbook.

It is an object of the invention to provide improved elements and arrangements thereof, in an apparatus for the purposes described, which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

To better understand the preferred embodiment of the present invention, game play is first described generally. After booting the program on a personal computer, a student sets up a playing field of a game screen by entering a premise and a conclusion from a theorem (or other problem) into each of two boxes labelled GIVEN and CONCLUSION. The theorem may be chosen from a set of set-up cards, each displaying one theorem from the universe of theorems known; however, other options are available to the student by which to custom label the theorem or geometric figures and to correlate printed matter with the game program displays. By selecting from a certain menu and submenu, each card may be reviewed. Geometric figures associated with the theorem may be automatically provided or drawn on the screen by the student.

After setting up the playing field, the student then chooses from a set of playing cards, each card displaying a specific mathematical concept from the universe of mathematical concepts such as definitions, postulates, constructions, properties and theorems. The chosen playing card is then placed on the playing field. After each card has been correctly placed, the computer draws a line between the properly placed cards, connecting proper premises and conclusions to each other and the GIVEN box or CONCLUSION box. The system allows a chosen playing card to be dragged by means of a mouse to the playing field below the GIVEN box (or above the CONCLUSION box) and, if properly placed, to "stick" in place on the playing field. Improperly placed cards "snap" back to their original file position. Thus, the system allows a proof to proceed with immediate feedback regarding the correctness of the selection by the student; correct linkage of the steps proving the theorem is thus clearly drawn and visible to the student.

As the present system will be understood to be exercised with the use of a computer, it will be appreciated that any class of such apparatus may be employed, such as a PC, XT, AT or other type including a micro-processor, storage device and output device, the latter including at least a monitor (preferably a color CRT), input means (preferably a mouse and keyboard), and optionally also a printer. These components are all well known in the art and need not be described herein.

Figure 1:
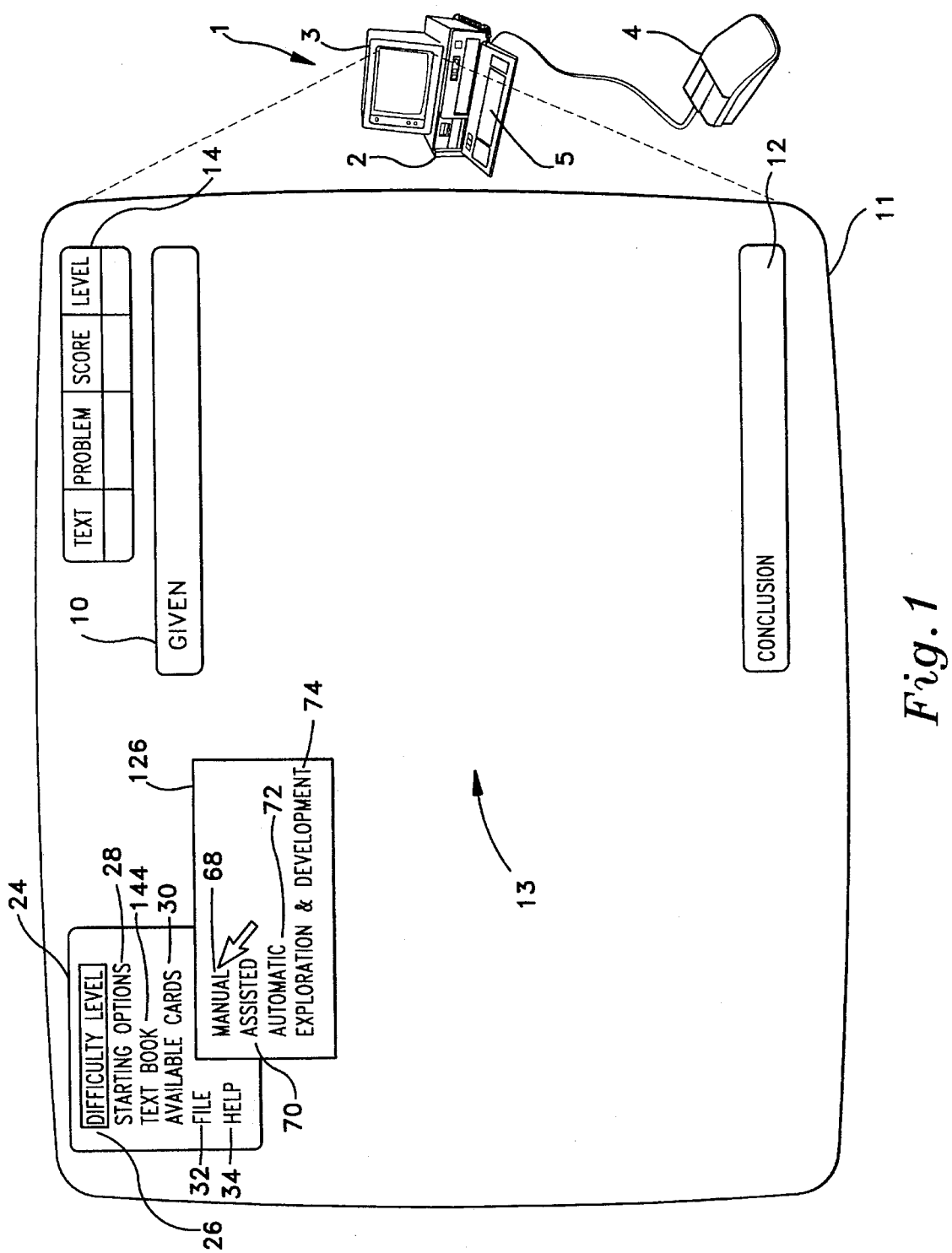
FIG. 1 is a diagrammatic representation of a first screen as shown on a computer with mouse and featuring a playing field and menu and submenu directed at choosing a difficulty level of play.

Nevertheless, referring to FIG. 1, the preferred embodiment of the present system is represented by a personal computer 1 having a software program installed into the memory means of a central processing unit 2, and further having a monitor 3, a mouse 4, and keyboard 5. Each screen shown in FIGS. 1 through 12 are generally structured using windows, also well known in the prior art, generated and provided as interactive displays and input areas used for both operating the program and playing the game. It should be understood that the structure shown in each Figure as a representative screen is not intended to be a limitation on the structure of the present invention.

FIG. 1 shows a representative first screen 11 generated by the game program outlining the basic components and options of the system. Specifically, a playing field 13 is provided, to be used by the student during the game for placement of chosen set-up and playing cards, where a proof is constructed. Throughout the description of the preferred embodiment and generally, the playing field 13 will appear to the right side of each screen and the operative windows will appear to the left whenever possible, for clarity and organization. Next, a startup window containing a menu, Options Menu 24, provides a plurality of choices to a student for interaction with the program (i.e. to set up and play the game, acquire help, save, exit, and use other necessary commands). Next, to the right and below the Options Menu 24, the playing field 13 is structured with a fill-in box labeled GIVEN 10 at the top of the playing field 13 and a fill-in box labelled CONCLUSION 12 at the bottom, reflecting the traditional format to begin a proof. The first screen 11 may also be provided with a status window 14 for automatic display reflecting the student's choices from the Options Menu 24 as well as scoring of each game played; alternatively, the status window 14 may be commanded to appear when needed.

From the first screen 11, a student first electronically interacts with the Options Menu 24 by choosing from Difficulty Level 26, Starting Options 28, Available Cards 30, File 32, Text Book 144, File 32 or Help 34. When any one of these menu options are chosen, through the use of a click of the mouse or pressing enter with the keyboard 5, the appropriate option is highlighted and a submenu will appear on the screen. A submenu may be tiled over a previous menu.

If the student first chooses the Difficulty Level 26 icon from the Options Menu 24 (a choice is highlighted in a menu or submenu by the box surrounding the icon, as suggested in FIG. 1), the Difficulty Level Submenu 126 opens. The Difficulty Level Submenu 126 provides a student multiple levels of difficulty in which all, part or none of the mathematical concepts necessary to build the theorem are automatically presented to the student for selection during the course of play. The Difficulty Level Submenu lists four levels: Manual 68, Assisted 70, Automatic 72, and Exploration & Development 74. The student may click on Difficulty Level 26 at any time during set-up or play in order to change the level of difficulty at which the game is operating, for example, to allow a "stumped" student to choose a less difficult level for use with the rest of a problem.

Choosing Automatic 72 commands the program to run so that a chosen problem is automatically solved and the proof is graphically displayed in its entirety upon the playing field 13. Alternatively, choosing Assisted 70 runs the program to display a subset of all correctly playable cards chosen from the universe of all playable cards found under Available Cards 30; the student must nevertheless enter each card onto a presently existing state of the playing field 13 in a proper order. This feature limits the playable cards universe to a set of cards from which the student can choose with the knowledge that at least one arrangement of the presented cards is correct and place them onto the playing field 13 accordingly on her own.

Exploration & Development 74 is the most advanced level, wherein the student is not confined to solving or proving any preexisting theorem or mathematical concept. The program eliminates the need to enter a conclusion into the CONCLUSION box 12 and only a premise must be provided in the GIVEN box 10. All graphic connections made by the computer necessarily connect the premise to a subsequent card, if correctly placed. The student is thus free to explore and discover an unknown result.

Finally, the default difficulty level is Manual 68, which level allows the student to solve a problem with a known result without automatic assistance by the computer, except as otherwise instructed by the student through the use of manually entered options and commands. In FIG. 1, a cursor arrow is shown positioned near the Manual 68 level. When the mouse is clicked over the icon, the Manual difficulty level is chosen, and the Difficulty Level Submenu 126 may disappear to prevent crowding of the screen.

Figure 2:
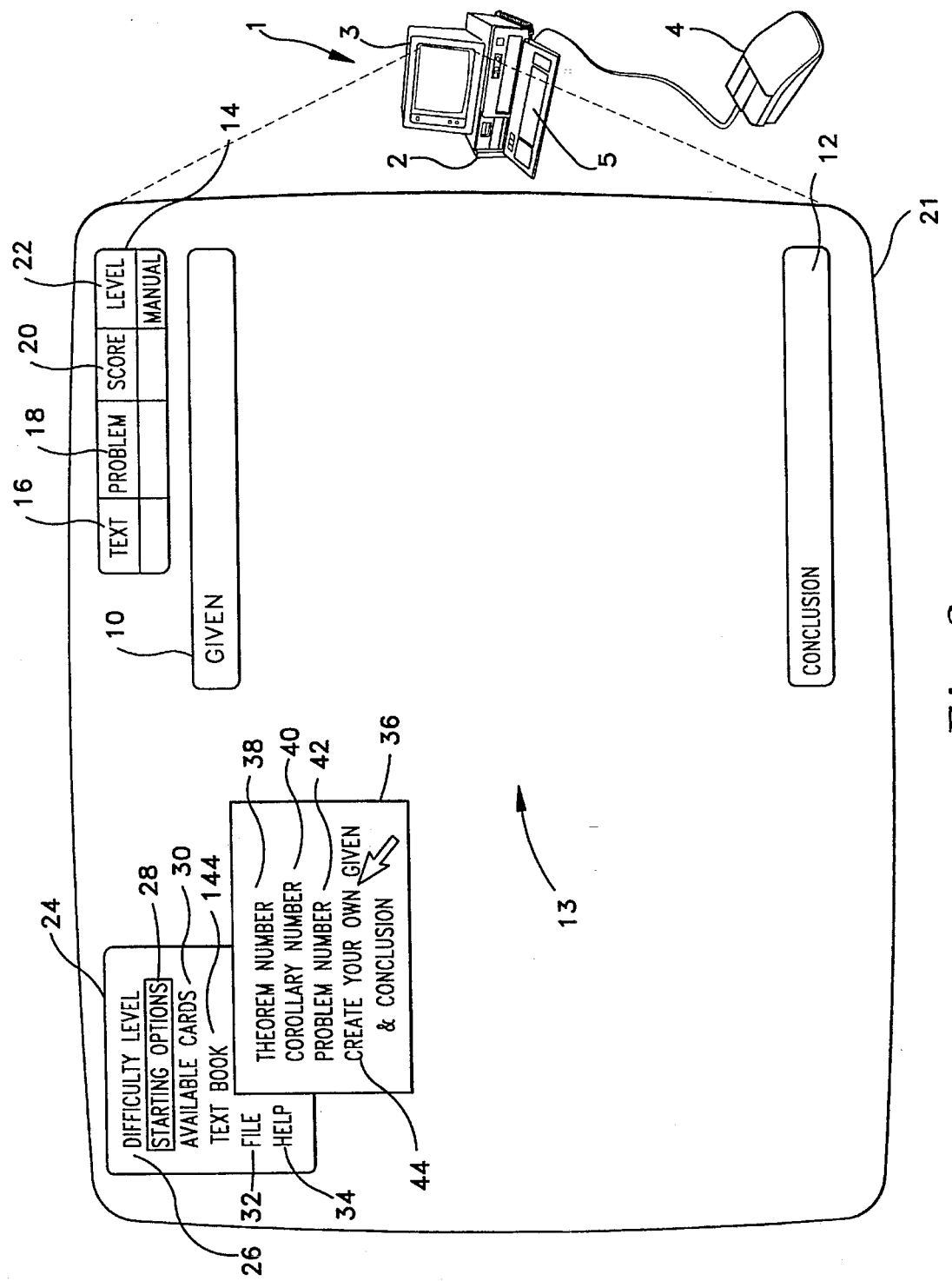
FIG. 2 is a diagrammatic representation of a second screen as shown on a computer and featuring a menu and submenu directed at choosing a starting option for play.

Having thus selected the difficulty level, the student again interacts with the Options Menu 24 to proceed. FIG. 2 shows a second screen 21 having a current status display 14. The display may include subdisplay areas which provide indicia of a text book 16 (indicates that a predetermined text book correlated with a predetermined customized version of the game program is available), indicia of a chosen problem in the text book 18, indicia of a present game score 20, and indicia of the difficulty level chosen by the student 22. The Manual level of difficulty is indicated in subdisplay area 22 as having been previously chosen.

The second screen 21 also shows a highlighted menu listing, Starting Options 28 having been previously selected by interaction of the student with the Options Menu 24. A Starting Options Submenu 36 is generated as a result of this selection. Five options listed on the Starting Options Submenu 36 include Theorem Number 38, Corollary Number 40, Problem Number 42, Text Book 144 and Create Your Own GIVEN & CONCLUSION 44. These options include groups of predetermined test matter from which a student may choose, which may require customizing by the student.

The customizing feature of the present invention allows labelling each geometric figure and mathematical statement of the premise and conclusion with an appropriate indicia, usually letters of the alphabet. This is not simply a transcription or copying task whereby a label is arbitrarily applied to each statement of the theorem or component of the figure, but rather requires that the student recognize correct relationships between the statements of the premise and conclusion and the geometric figure. For example in the Isosceles Triangle Theorem, terms such as "triangle", "segment", and "angle", must be customized and may become "triangle ABC", "segment AB", "segment BC", "angle B" and "angle C". This requires that the student recognize that segment AB and segment BC are congruent sides and angle B and angle C are the opposing, congruent angles.

Figure 3:
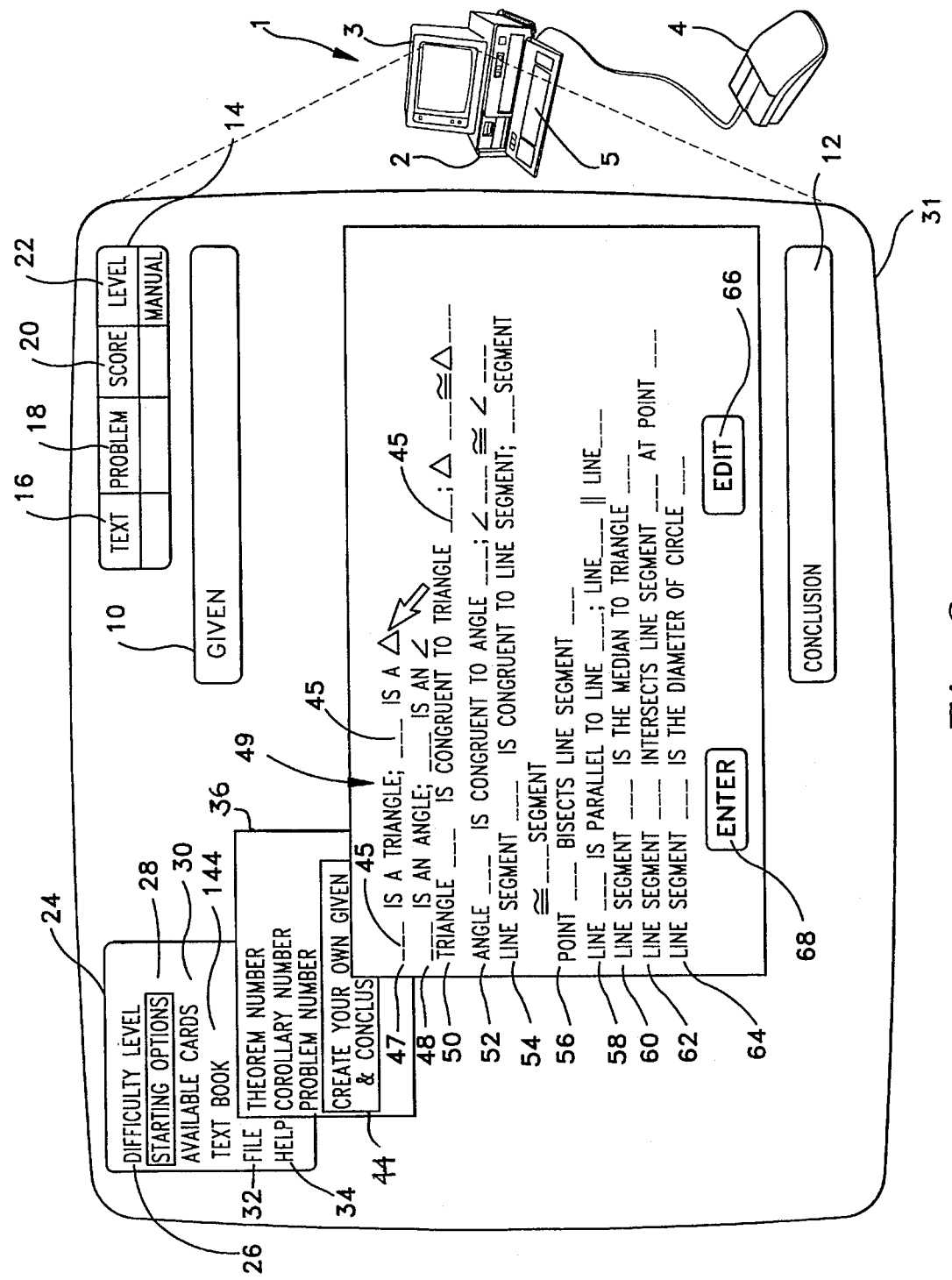
FIG. 3 is a diagrammatic representation of a third screen dependent from the screen as shown in FIG. 2 and featuring a card directed at a specific starting option from which standardized mathematical statements may be chosen and entered upon the playing field.

As shown in FIG. 3, a third screen 31 is shown, wherein the Create Your Own GIVEN & CONCLUSION 44 (CYOGC) option has been selected, whereby a set-up card, Statements Card 46, has appeared containing a plurality of mathematical standardized statements 49, each in need of customizing. The Statements Card 46 gives a correct form for each standardized statement 49 of the universe of standardized statements 49 provided under CYOGC 44, leaving entry blanks 45 for customizing each statement. It should be noted that although mathematical statements can be either worded or comprised of mathematical symbols, a standardized statement 49 must be identical wherever used so that it can be recognized in the program when run; for convenience and to avoid entry errors, it may be necessary to show each mathematical statement as a standardized statement 49 on every playing card, statement card, theorem card, etc., for use by the student for entry into the appropriate box. For example, the standardized statements 49 shown on the Statement Card 46 are: _ is a triangle 47, _ is an angle 48, triangle _ is congruent to triangle _ 50, angle _ is congruent to angle _ 52, line segment _ is congruent to line segment _ 54, point _ bisects line segment _ 56, line _ is parallel to line _ 58, line segment _ is the median to triangle _ 60, line segment _ intersects line segment _ at point _ 62, and line segment _ is the diameter of circle _ 64. Obviously, more than one statement card may be used to organize and display the necessary universe of standardized statements 49.

The student chooses each standardized statement 49 off the Statement Card 46 which corresponds to the theorem sought to be proved, and enters each standardized statement 49 into the GIVEN box 10 and the CONCLUSION box 12 as appropriate. An Edit Icon 66 is provided, which may be clicked so that the student can move the cursor to any needed standardized statement 49 and, by clicking over the statement, drag it to the GIVEN 10 or CONCLUSION 12 box. The student then enters the statement by clicking on the Enter icon 68. The standardized statement 49 is then customized by clicking onto each blank 45 and typing in the appropriate letters as determined mathematically appropriate.

Figure 4:
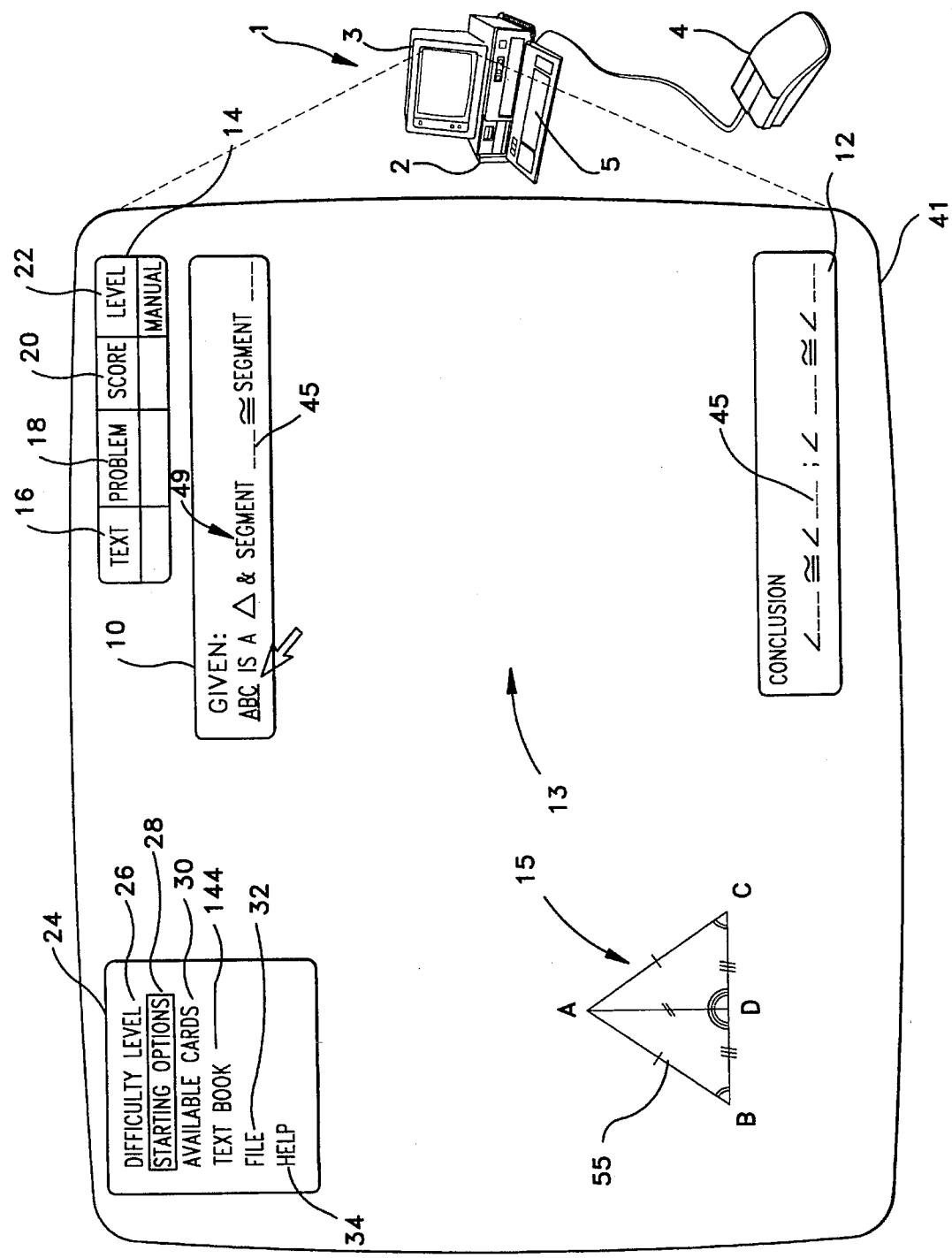
FIG. 4 is a diagrammatic representation of a fourth screen directed at customizing a standardized mathematical statement entered upon the playing field.

Should an incorrect letter be entered, e.g. angle A is entered into the conclusion of the above-customized Isosceles Triangle Theorem as being one of the congruent angles, the letter may flash or otherwise be highlighted to indicate an incorrect entry. The letter may be corrected by using the Edit Icon 66 of the Statement Card 46. FIG. 4 shows a fourth screen 41 representing an intermediate state of a statement of the Isosceles Triangle Theorem being so customized.

When CYOGC 44 is chosen, a graphics drawing program, as may be found in the prior art, also generates appropriate cursors, instruction panels, and the like at this stage so that the student can illustrate, create and customize a geometric figure appropriate to the statements chosen. This figure may be located in a drawing area 15 to the left of the playing field 13; such a geometric FIG. 55 is also shown in FIG. 4 properly customized and hatched according to standard geometric conventions. Although the principals of operation of a drawing program are known, the present invention utilizes and incorporates a drawing program such that each customized point or figure component is appropriately coordinated with a customized theorem or other statement.

After the geometric figure, premise and conclusion have been placed in the appropriate area and initially correctly customized, the student presses the Enter key of the keyboard 5 or clicks on the Enter Icon 68 to enter the standardized statements 49 into memory in order to allow play to commence. When Enter is pressed or clicked, the Statements Card 46 disappears because alteration of the statements entered into the GIVEN box 10 and CONCLUSION box 12 is unnecessary and undesired. However, the graphics drawing program is provided throughout the course of play of the game in order that the student may draw segments, bisectors, and the like onto the figure as necessary and as each playing card is played on the playing field. The student may thus continue to alter, by using an Edit Icon 66 and Enter Icon 68, the geometric figure to correspond with the playing cards played. An incorrect entry is treated as previously described when customizing.

Figure 5:
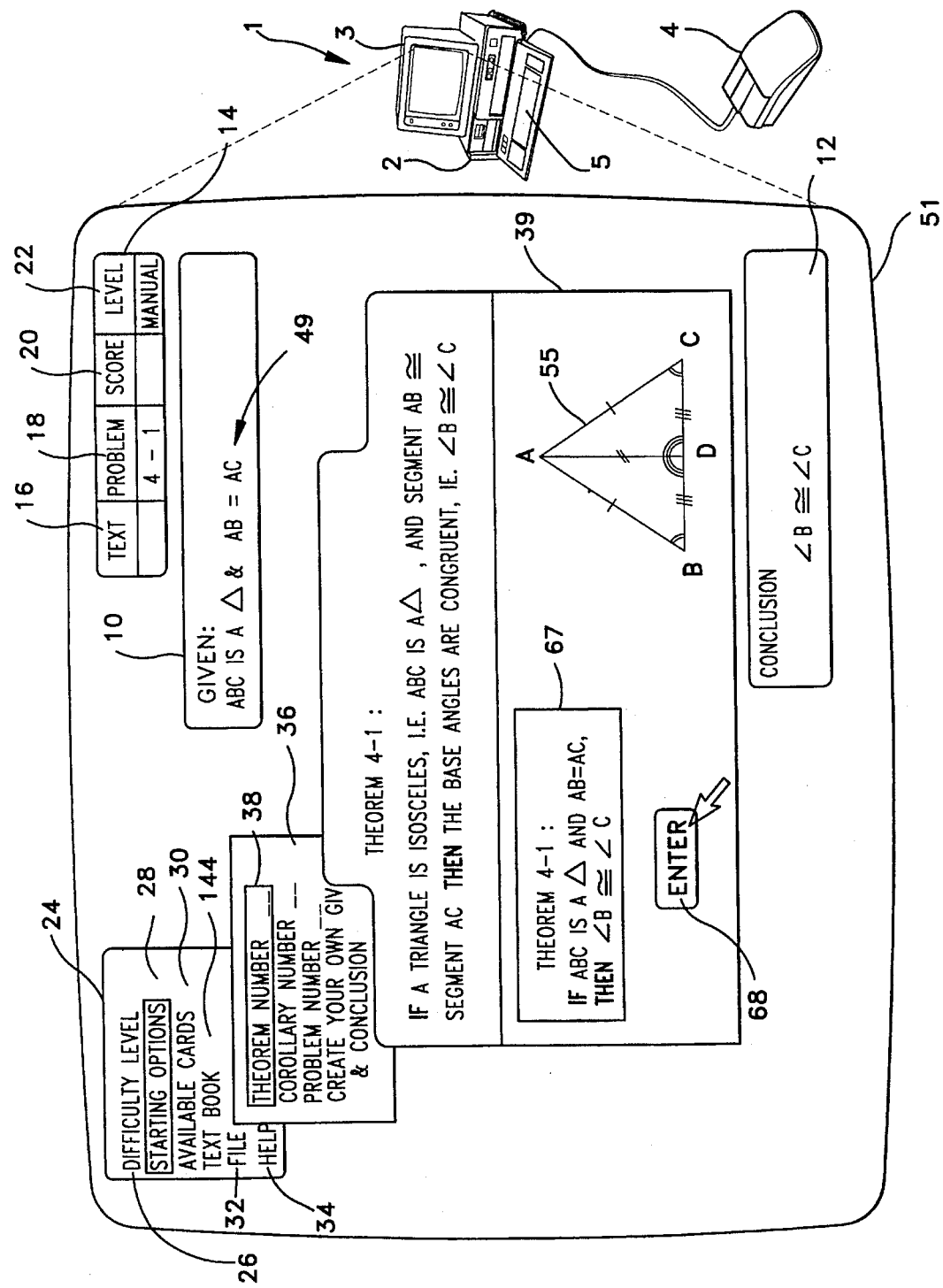
FIG. 5 is a diagrammatic representation of a fifth screen dependent from the screen as shown in FIG. 2 and featuring a card directed at a specific starting option from which a predetermined theorem has been chosen and entered onto the playing field.

Referring now to FIG. 5, Theorem Number 38 allows the student to enter by keystroke a predetermined indicia associated with a predetermined set of prenumbered theorems. For example, if the Isosceles Triangle Theorem has been arbitrarily identified as "4—1", this indicia may be entered into a blank space 45 following the Theorem Number icon 38, thereby commanding a theorem card 39 to appear on the screen. The premise, conclusion and geometric figure also automatically appear in their respective GIVEN and CONCLUSION boxes 10, 12 and drawing area 15. An example of how a fifth screen 51 might appear when so entered is shown in FIG. 5. The theorem card 39 may be pre-customized or may be provided with blank spaces like the Statement Card 46 of FIG. 3 for customizing by the student. Moreover, a standardized statement block 67, as shown in FIG. 5 and containing the Isosceles Triangle Theorem in a standardized mathematical form, is provided from which each standardized statement 49 may be dragged to the GIVEN box 10 or CONCLUSION box 12. Likewise, corollaries and problems can be made to appear by similarly entering the appropriate indicia following the respective icons Corollary Number 40 and Problem Number 42.

As noted above, either Theorem Number 38, Corollary Number 40, and Problem Number 42 allows the student to enter by keystroke a predetermined indicia associated with a predetermined set of prenumbered mathematical concepts or problems. It is emphasized that such predetermined indicia may be coordinated with preprinted textual mathematics problems. If a custom-made program is provided associated with at least one text book, the Options Menu 24 must have a means for executing the choices necessary to work with the coordinated text.

Figure 10:
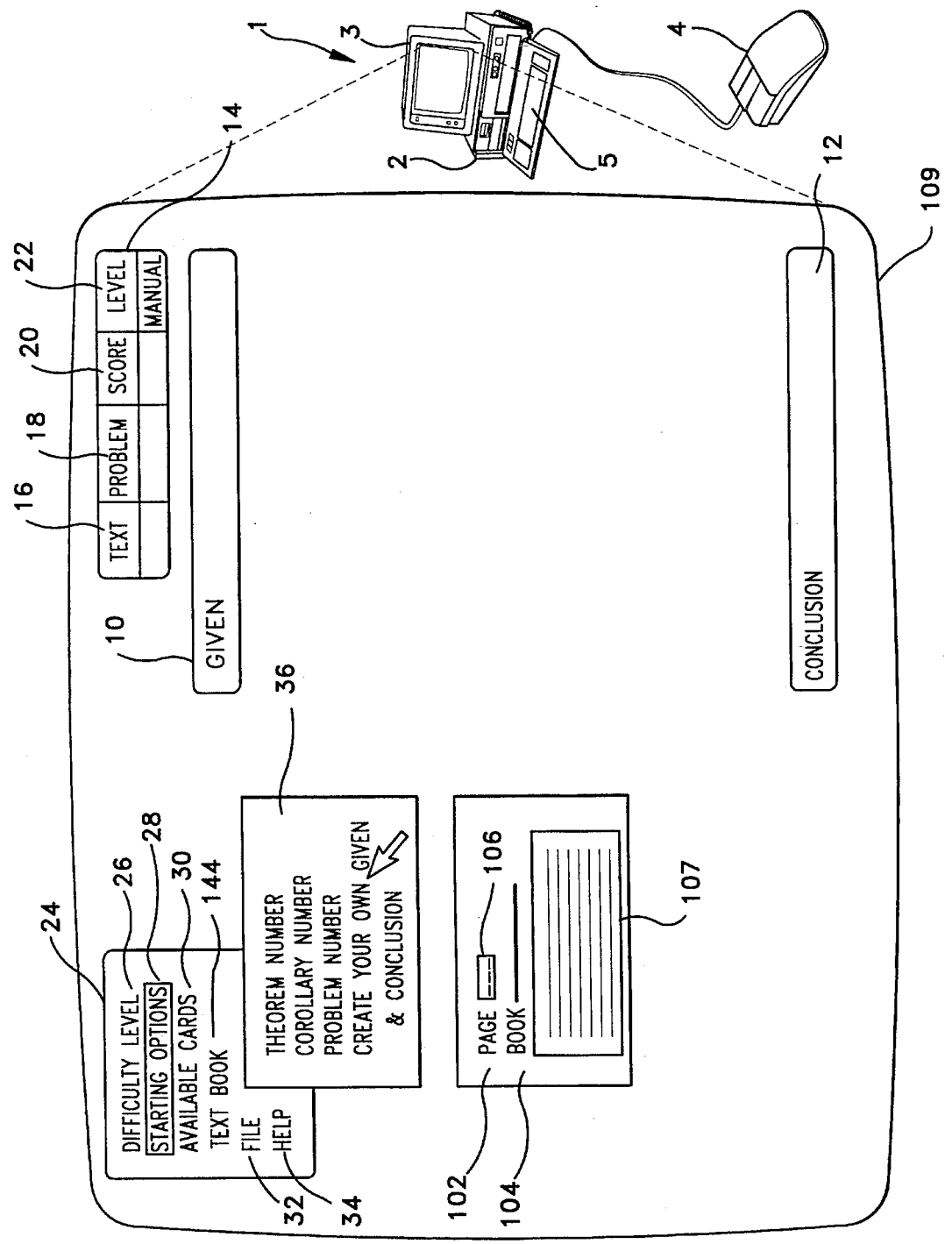
FIG. 10 is a diagrammatic representation of a screen directed at retrieving predetermined page and text information corresponding to a given mathematics problem.

The Text Book icon 144 represents such means and is shown in each Options Menu 24 beginning with FIG. 1. Referring specifically to FIG. 10, a tenth screen 109 is shown directed to the Text Book Submenu 100 and the Starting Options Submenu 36 generated when the Text Book icon 144 is clicked on the Options Menu 24. Indicia entered into the blank space after Theorem Number 38, Corollary Number 40, and Problem Number 42 must correspond to a specific text book to which the program is coordinated. Alternatively, if more than one text book is associated with the program, a blank space following Book 104 on the Text Book Submenu 100 may used for entry of indicia referring to the chosen text book. When the Book 104 option appears, a list of those text books which are contained in the programs database may appear in area 107. The text book which is to be followed by the program may be highlighted.

Entering indicia of a page number of the text book into the blank space 106 following the Page icon 104 would cause the program to retrieve the indicated page of the text book, which may also appear in area 107. More importantly however, by using the Page 104 function, the playing cards under the Available Cards 30 files are restricted to only those covered in the text found on page numbers preceding the entered page number. Thus, as the game is set up and played, set-up cards and playing cards having mathematical concepts first found on pages of the text subsequent to the page number entered will not be displayed.

Upon entry and customization of the statements in the GIVEN and CONCLUSION boxes 10, 12, a chosen theorem, corollary, or problem number thus has been entered into memory and is ready for play, and the Starting Options Submenu 36 disappears.

Figure 6:
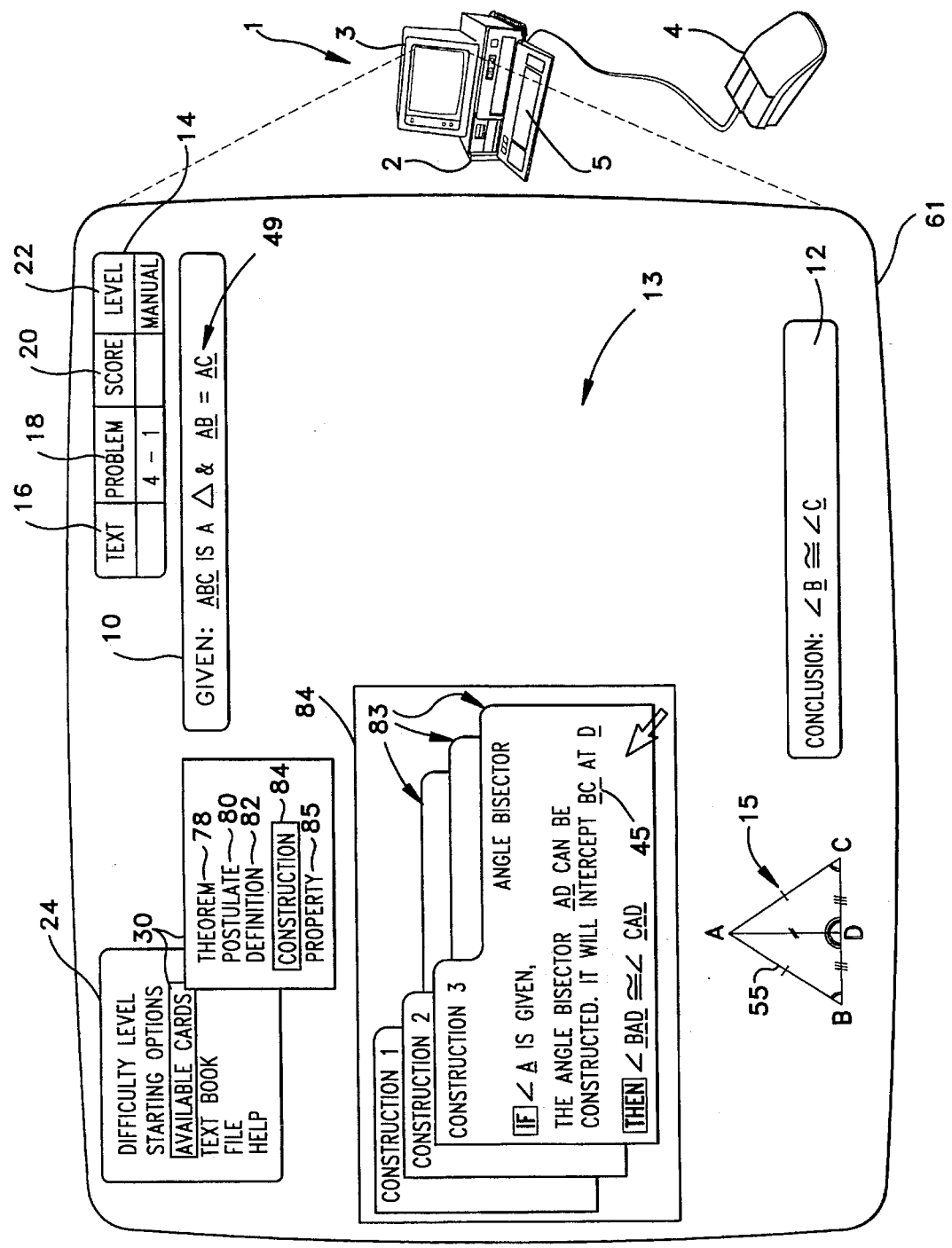
FIG. 6 is a diagrammatic representation of a sixth screen, dependent in large part from the screen as shown in FIG. 5, in a state ready for play and featuring a plurality of playing cards from which to choose to enter onto the playing field.

Referring now to FIG. 6, a sixth screen 61 is shown at an initial stage of play at the Manual 68 difficulty level. The student proves a theorem by selecting cards from the groups listed on the Available Cards Submenu 30 which is a submenu of the Options Menu 24. Contained under Available Cards 30, each individual definition, postulate, construction, property and theorem is identified and stored as an individual playing card 83, which is categorized by files and may be drawn by the student during play to build the proof. The Available Cards Submenu 30 contains the files Theorem 78, Postulate 80, Definition 82, Construction 84, and Property 85. A Construction file 84 showing a plurality of playing cards 83 is shown, having been chosen by a student by clicking on or commanding from the appropriate menu and submenu options, as suggested by the highlighted Available Cards Submenu 30 and Construction 84 icons. If a geometric figure and mathematical statement has been customized during set-up, each subsequent playing card 83 must be customized by the student before the computer can identify the card to determine whether it has been placed in a mathematically correct manner during play.

During play, the student selects a playing card 83 which she thinks contains a mathematically correct statement; one such card, for use in proof of the Isosceles Triangle Theorem, is shown in FIG. 6 as "Construction 3". The student customizes each such playing card 83 by filling in the statement blank spaces 45 with the appropriate labels, as previously described. Like before, if the associated letters entered into the statements of the premise (IF) or conclusion (THEN) are not consistent with the letters entered into the statements entered into the GIVEN box 10 and CONCLUSION box 12, an error message will be provided, such as causing the erroneous letter to blink until they are corrected.

Figure 7:
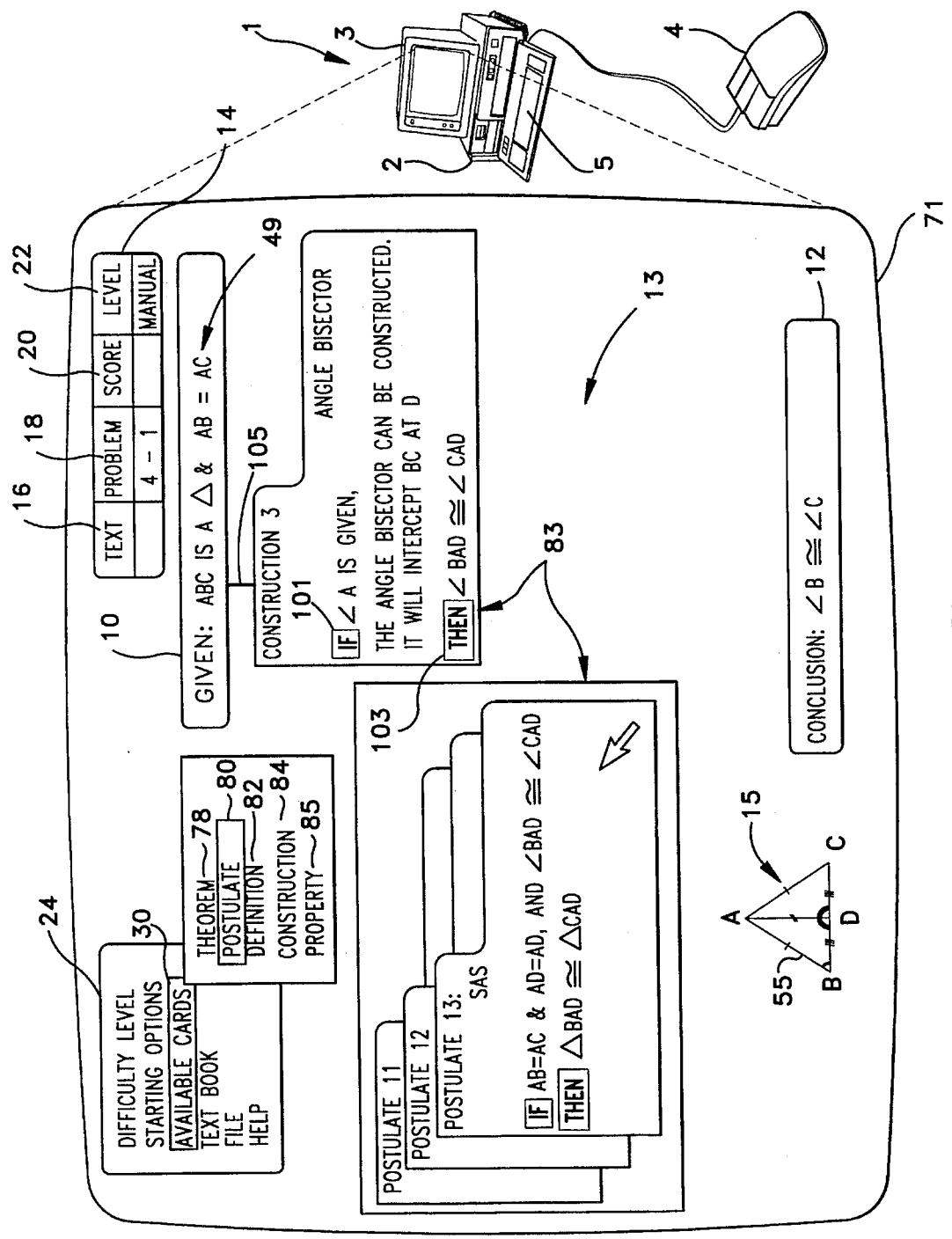
FIG. 7 is a diagrammatic representation of a seventh screen, dependent in large part from the screen as shown in FIG. 6, at an intermediate stage of play and featuring a plurality of playing cards from which to choose for entry onto the playing field.

If the playing card 83 has been properly customized, the card 83 may be dragged onto the playing field 13. The computer will determine if it has been played in a mathematically correct position. If the chosen card is correct where dragged, it will "stick" in that spot. If the card is not correctly placed, then it will "snap" back to its file. FIG. 7 shows a representative seventh screen 71 wherein a correctly placed card 83 is shown.

For a card to have been placed in a mathematically correct position depends upon two factors: the identity of a standardized statement of one playing card with another statement found on the playing field, and, the relative position of the playing card on the playing field to another statement. Specifically, a playing card can be mathematically correctly played in one of two ways. First, each statement of the premise of a played playing card must also appear either (1) among the group of conclusions found on and formed by the group of playing cards of at least one other card played above the played playing card, (2) in the statement entered into the GIVEN box 10, or (3) in a combination of (1) and (2). Alternatively, at least one statement in the conclusion of a playing card statement must appear either A) in the premise of a statement on a playing card played below it, B) in the statement entered into the CONCLUSION box 12, or C) a combination of A) and B).

In practice and as suggested by FIG. 7, the system first checks mathematical correctness by comparing each standardized statement following the IF statement box 101 of the selected playing card 83 to standardized statements found following a THEN statement box 103 of a playing card placed above the selected playing card. If no THEN boxes 103 are located in the playing field 13 above the selected playing card 83, the GIVEN box 10 is searched. If a match can be found for each statement following the IF box 101 in the playing field 13 above the played card, the computer will then display at least one connecting line 105 between the top of the selected playing card 83 and either the bottom of each previously played playing card 83 above having matching THEN statements or the bottom of the GIVEN box 10 having a matching premise statement 49. Thus, if any one statement following the IF box 101 of the selected playing card 83 fails to match a statement found in the playing field 13 above, then no connecting lines 105 will be drawn between the statements.

The system next checks mathematical correctness by comparing each standardized statement following the THEN statement box 103 of the played playing card to standardized statements found following an IF statement box 101 of cards played below the played card 83. If no subsequent IF boxes 101 are located in the playing field below, the CONCLUSION box 12 is searched. If a match of the statement in the IF statement box 101 of the selected playing card 83 can be found with any statement following the THEN box 103 in the playing field 13 below the selected playing card 83, the computer will then display at least one connecting line 105 between the bottom of the selected playing card 83 and either the top of each playing card 83 below having any matching IF statements or the top of the CONCLUSION box 12.

The final step in the system of checking mathematical correctness is the decision to reject the selected playing card 83. First, if no connecting lines 105 are displayed, the selected playing card is rejected and is mathematically incorrect. Alternatively, if all of the statements of a selected playing card 83 following the GIVEN and the CONCLUSION boxes 10, 12 match, the card is also rejected; circular reasoning has been used to prove a theorem by itself. In either circumstance, the selected playing card 83, having been dragged out to the playing field 13, is rejected by having it "snap" back to its original position (i.e. returned to its file).

It should be noted that if a color monitor 3 is provided, the connecting lines 105 and standardized statements 49 may be color coordinated. Any coordination scheme, in order to be relevant, should have a mathematical significance. For example, one such suggested scheme may include that all customized statements containing angles may be generated having red indicia. Therefore, each premise or conclusion containing a red standardized statement 49 would generate a red connecting line 105 to the next playing card. Obviously, other mathematically significant color coding schemes may be used.

After each card is successfully played and in order to determine whether the theorem proof has been successfully completed, the system verifies whether a continuous bridge of connecting lines 105 and playing cards 83 exists between the GIVEN and CONCLUSION boxes 10, 12. For each standardized statement 49 in the CONCLUSION box 12, a connecting line 105 must have been provided extending upward from the CONCLUSION box 12 to at least one of the interposed cards 83 which is connected by bridge links to a standardized statement 49 in the GIVEN.

Figure 8:
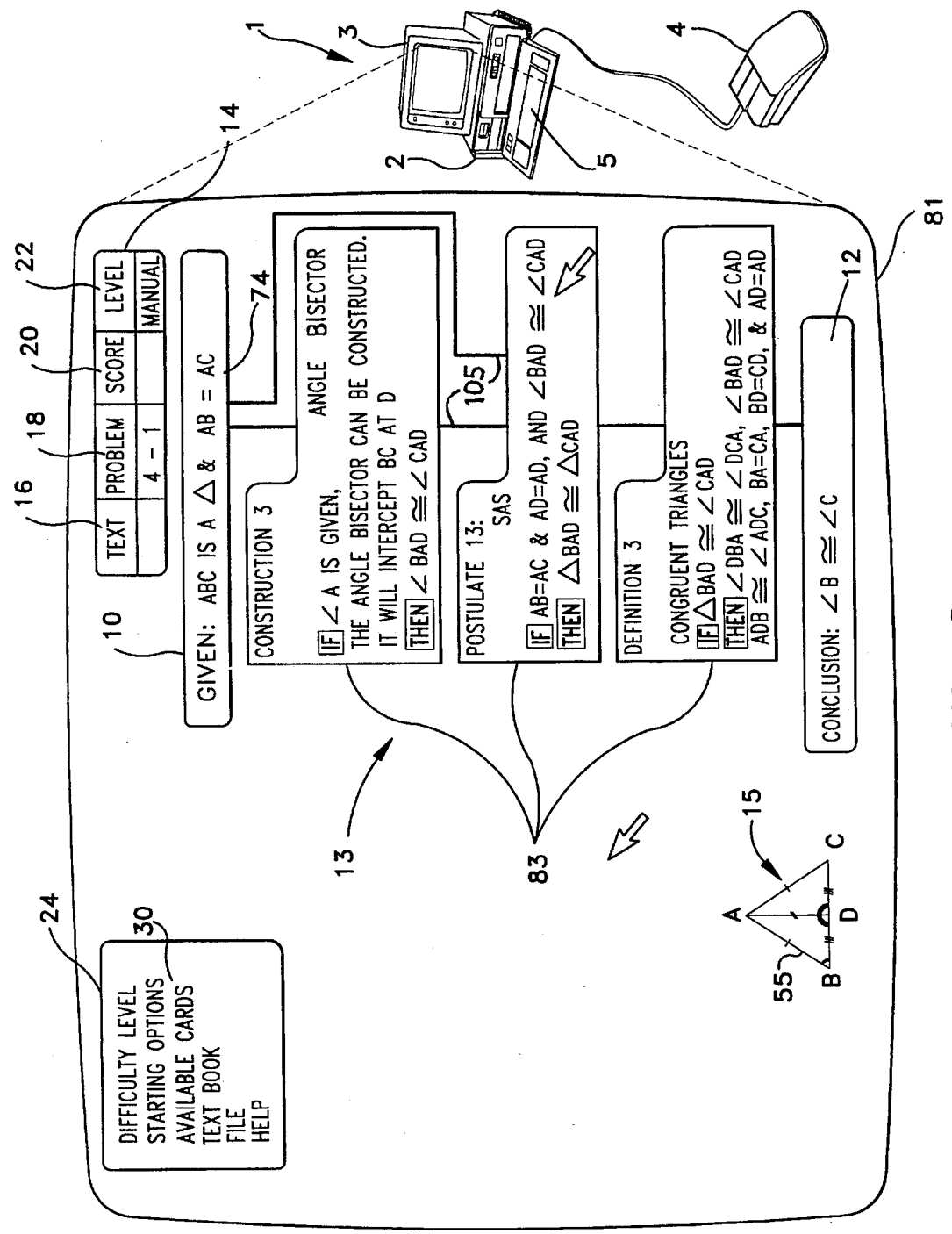
FIG. 8 is a diagrammatic representation of an eighth screen, dependent in large part from the screen as shown in FIG. 7, in a final stage of play and featuring a completed proof.
Figure 9:
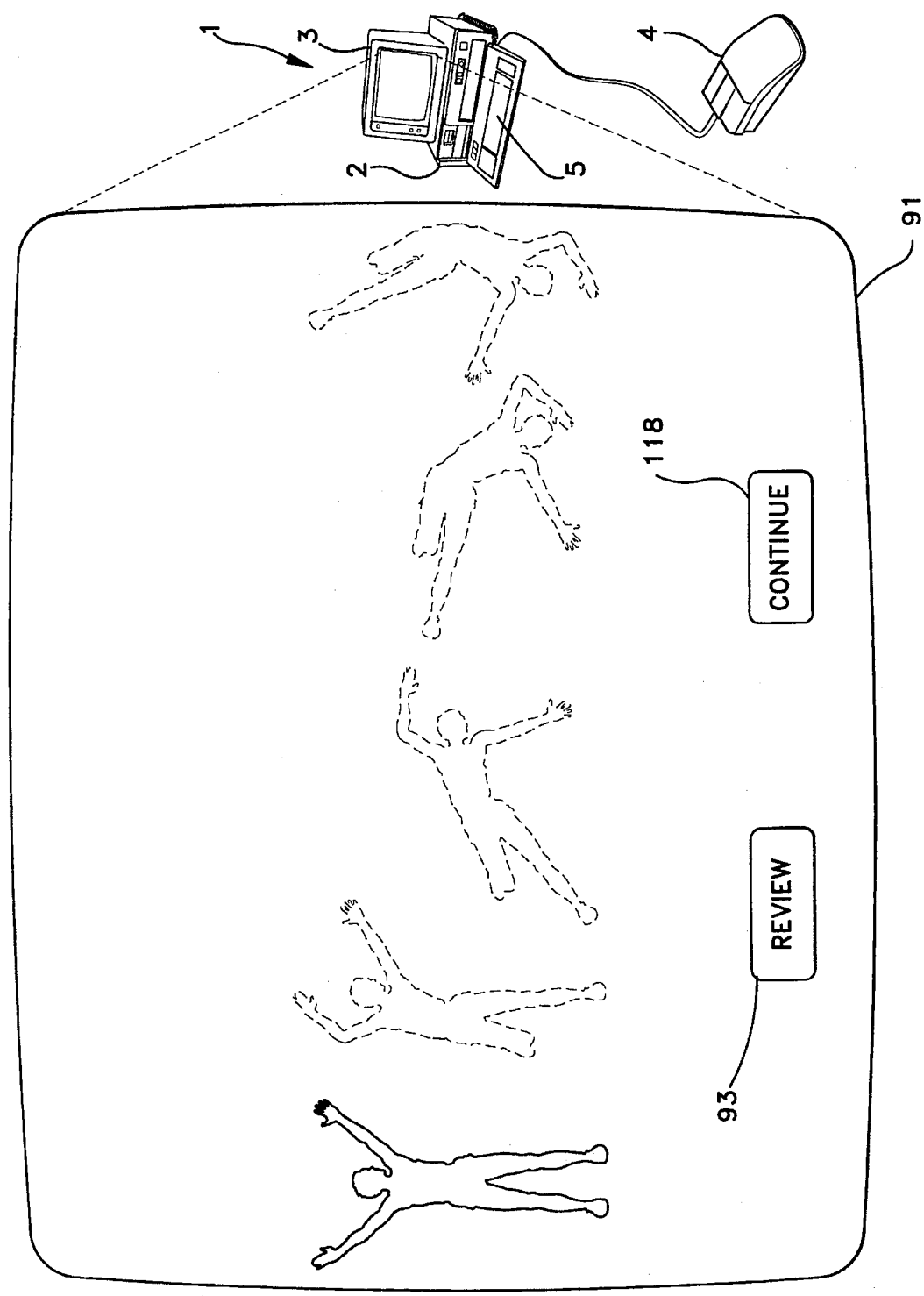
FIG. 9 is a diagrammatic representation of a screen generated by the completion of a proof for entertainment showing a character performing a series of flips.

All statements thus being connected, the proof is complete; a representative completed proof of the Isosceles Triangle Theorem is shown in the eighth screen 81 of FIG. 8. A reward screen 91 may be generated immediately upon completion, as seen in FIG. 9. A representation of Euclid doing flips is suggested. However, should the student wish to review her work, a Review icon 93 is provided, which can be clicked upon to return to the completed work screen. A Continue icon 118 is provided to clear the screen and return to the first screen 11 to start play again.

Figure 11:
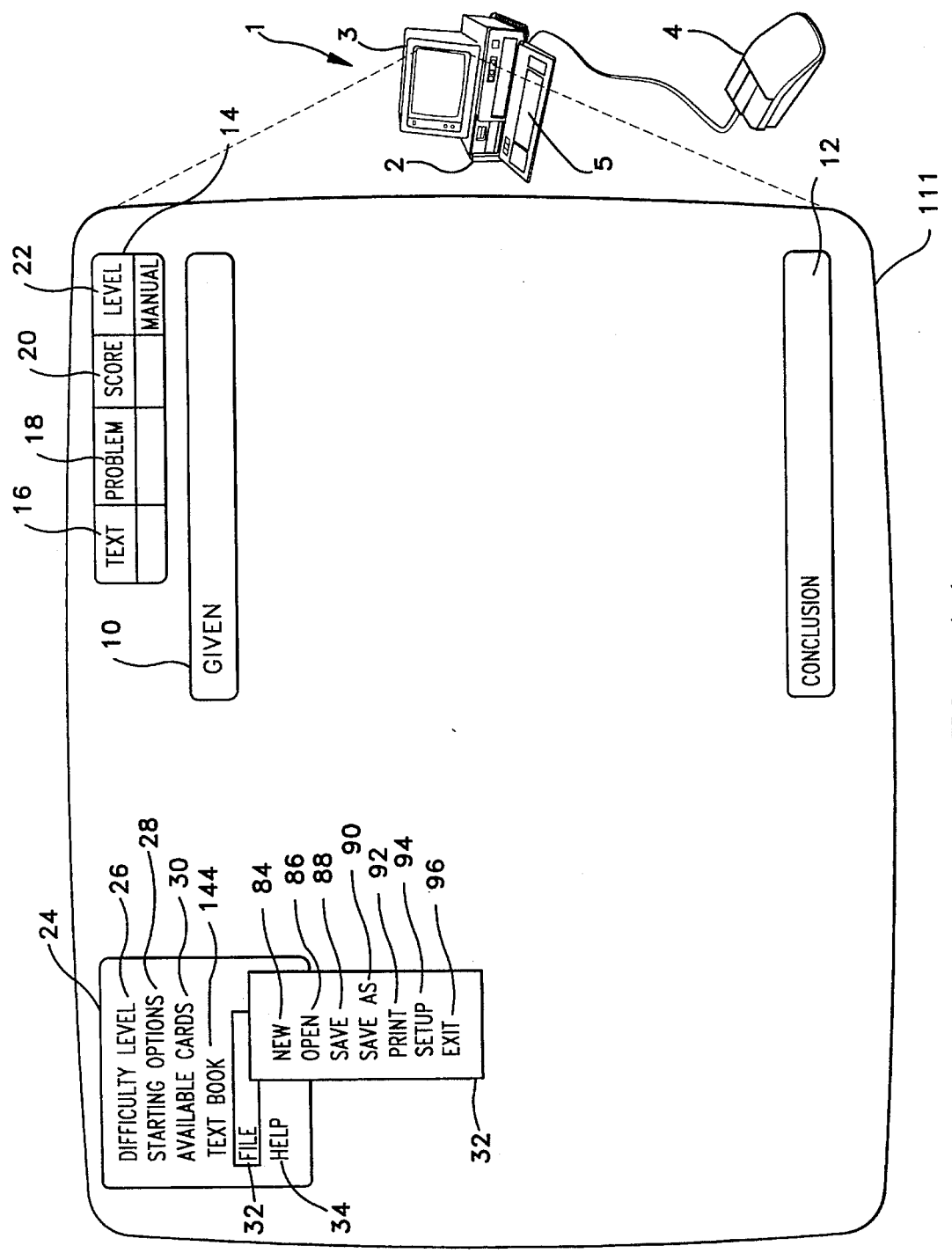
FIG. 11 is a diagrammatic representation of a screen directed at standard program operation and execution commands for saving and retrieving predetermined information corresponding to mathematics problems.

FIG. 11 shows an eleventh screen 111 directed at a suggested submenu for operation of the program, namely File Menu 32, which is a submenu of the Options Menu 24. Options available on the File Menu 32 may include New 84, Open 86, Save 88, Save As 90, Print 92, Setup 94, and Exit 96. These icons should be understood to represent any means necessary to execute and operate standard computer program functions commonly known in the prior art.

It is to be understood that the present invention is not limited to the sole embodiment described above, but encompasses any and all embodiments within the scope of the following claims.

I claim:

1. A method of teaching geometry proofs, employing a digitized computer having at least an input means for user interactive inputting, including keyboard means for entry of alphanumeric characters, a processing means including a memory means, and a computer display terminal, said computer capable of and programmed to generate and display a playing field on the computer display terminal, said playing field having a top boundary proximate to which a first area is labelled with indicia of a geometry premise and further having a bottom boundary proximate to which a second area is labelled with indicia of a geometry conclusion, said computer further capable of and programmed to generate icons displayed on the computer display terminal for interactive input by the user, said icons including a plurality of playing cards identifying each of a predetermined universe of theorems, postulates, constructions, definitions, and properties, each having at least a premise and a conclusion, and further including a plurality of set-up cards identifying each of a predetermined universe of mathematical statements comprising each theorem, postulate, construction, definition, and property, and said computer further capable of and programmed to generate graphics displayed on the computer display terminal for interactive input by the user, comprising:

inputting by said input means at least one command to generate a plurality of set-up cards on said computer display terminal;

selecting at least one set-up card from said plurality of set-up cards;

inputting and displaying at least one of said each mathematical statement from said at least one set-up card into said first area;

inputting and displaying at least one of said each mathematical statement from said at least one set-up card into said second area;

comparing said mathematical statement in said first area and said mathematical statement in said second area with each said premise and each said conclusion of each of a predetermined universe of theorems, postulates, constructions, definitions, and properties to verify that an identity with at least one of said each premise and said each conclusion of said each of a predetermined universe of theorems, postulates, constructions, definitions, and properties exists;

rejecting at least one said mathematical statement from at least one of said first area and said second area if said identity fails to exist and returning said statement to its original storage location in said memory means;

continuing to display and storing both said mathematical statements in said memory means if said identity exists;

inputting by said input means at least one command to generate a plurality of playing cards on said computer display terminal;

selecting a playing card from said plurality of playing cards displayed;

inputting said playing card for display on said playing field below said first area and above said second area;

comparing each mathematical statement of the premise of said playing card to each said mathematical statement displayed in said first area and displayed in a conclusion of all playing cards displayed above said playing card for an identity between all mathematical statements present in said premise of said playing card and said mathematical statements displayed in said first area and displayed in said conclusion of all playing cards displayed above said playing card;

comparing each mathematical statement of the conclusion of said first playing card to each said mathematical statement displayed in said second area and displayed in a premise of all playing cards displayed below said playing card for an identity between any one mathematical statement present in said conclusion of said playing card and said mathematical statements displayed in said second area and displayed in said premise of any one playing card displayed below said playing card;

rejecting said first playing card from said playing field if said identity fails to exist, or storing said first playing card in said memory means and displaying said card on said playing field if said identity exists; and, generating a connecting line between said first playing card displayed and said area in which an identical statement appears.

2. A method of teaching geometry proofs according to claim 1, further including the step of verifying formation and display of a bridge of connecting lines from said first area to said second area.

3. A method of teaching geometry proofs according to claim 1, further including the step of customizing a mathematical statement comprising inputting at least one alphabetic character into a mathematical statement and storing it to said memory means.

4. A method of teaching geometry proofs according to claim 1, further including the step of inputting a series of commands to generate a graphic design comprising a geometric figure.

5. A method of teaching geometry proofs according to claim 1, further including the step of customizing a graphic design comprising inputting at least one alphabetic character onto a point of a geometric figure and storing it to said memory means.

* * * * *